United States Patent
Prokhorov (10) Patent No.: US 8,977,245 B2
(45) Date of Patent: Mar. 10, 2015

(54) AGENT-BASED SYSTEM FOR CALL VERIFICATION

(75) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 467 days.

(21) Appl. No.: 13/365,977

(22) Filed: Feb. 3, 2012

(65) Prior Publication Data

US 2013/0203390 A1    Aug. 8, 2013

(51) Int. Cl.
*H04W 4/00* (2009.01)

(52) U.S. Cl.
USPC .................................... 455/414.1; 455/414.2

(58) Field of Classification Search
USPC .................................... 455/414.1, 414.2, 566
See application file for complete search history.

(56) References Cited

U.S. PATENT DOCUMENTS

| | | |
|---|---|---|
| 6,853,717 B1 | 2/2005 | Frentz et al. |
| 6,891,939 B1 | 5/2005 | Urban et al. |
| 7,212,620 B1 | 5/2007 | Mastro |
| 7,233,656 B2 | 6/2007 | Bedingfield, Sr. |
| 2005/0245244 A1 | 11/2005 | Estevez et al. |
| 2010/0056119 A1 | 3/2010 | Shaffer et al. |
| 2010/0128863 A1 | 5/2010 | Krum et al. |

OTHER PUBLICATIONS

Phan, Jeremy (Jan. 12, 2010). True Caller: Automatic Caller ID Lookup. Retrieved on Sep. 2010, from http://www.sync-blog.com/sync/2010/01/truecaller-automatic-callerid-lookup.html.
IBM (May 14, 2004). Voice Based Automatic Call Screening. IP.com No. IPCOM000028409D.

*Primary Examiner* — Sam Bhattacharya
(74) *Attorney, Agent, or Firm* — Oblon, McClelland, Maier & Neustadt, L.L.P.

(57) ABSTRACT

An information-processing apparatus includes a communication unit that receives a telephone call from a telephone number of a calling party. The communication unit transmits a transmission of the telephone number to a search engine when the communication unit receives the telephone call. Further, the communication unit receives a result from the search engine after the transmission of the telephone number. The information-processing apparatus also includes a processing unit that determines whether a communication should be conducted with the calling party, by performing a textual search of the result for a plurality of predetermined words.

20 Claims, 6 Drawing Sheets

AGENT-BASED SYSTEM FOR CALL VERIFICATION

BACKGROUND

1. Technical Field

Aspects of the present disclosure pertain to an intelligent agent in a data-processing system that indicates whether a user should answer or return an incoming telephone call.

2. Background Art

Telemarketers place telephone calls to market products or services. To avoid these calls, people screen incoming telephone calls using caller identification (caller ID) services that display a telephone number of the calling party.

Some telephones further identify a calling party based on a locally-stored electronic phone book. If the electronic phone book does not include a telephone number corresponding to the calling party, the telephone might not be able to identify the calling party. That is, the telephone might display merely the telephone number of the calling party.

Further, if the electronic phone book accurately reflects a person's knowledge, then a telephone number unknown to the electronic phone book is also unknown to the person. To address that situation, some websites offer reverse telephone number lookup services.

To further assist in that situation, telephone comments websites have been developed. Such websites log user comments regarding particular phone numbers. Some comments on those websites pertain to the telephone numbers used by telemarketers.

Further, it has been proposed to block telephone calls if a system determines a driver of a vehicle is too busy with a critical driving task.

BRIEF SUMMARY

Telephone comments web sites require human intervention to operate. However, a person cannot always provide the requisite intervention when a telephone call is received. For example, a user might be too busy with a foreground task upon receiving a call.

The present inventor recognized the benefit of providing intelligent support for telephone calls received when a user is under time or attention constraints or cannot otherwise be distracted.

Embodiments and aspects of this disclosure relate to providing intelligent assistance so a user does not waste time on answering or returning telephone calls from unknown telephone numbers. In some embodiments, a user is presented with an indication not to answer or return the call if the telephone number from which the call is made is associated with a spammer, e.g., a telemarketer. Thus, the system includes an intelligent agent that identifies a telephone number as a background task employing the telephone's wireless Internet connection.

In a first embodiment, an information-processing apparatus includes a communication unit that receives a telephone call from a telephone number of a calling party, transmits a transmission of the telephone number to a search engine when the communication unit receives the telephone call, and receives a result from the search engine after the transmission of the telephone number. The information-processing apparatus also includes a processing unit configured to determine whether a communication should be conducted with the calling party, by performing a textual search of the result for a plurality of predetermined words.

Preferably, the processing unit determines whether the information-processing apparatus is in proximity to a vehicle.

In one aspect, the communication unit transmits a request to the vehicle, when the processing unit determines that the information-processing apparatus is in proximity to the vehicle. The communication unit receives a response to the request, the response indicating an output device available in the vehicle.

In another aspect, the communication unit transmits video data to the vehicle, when the response indicates the output device includes a video component, the video data indicating whether the communication should be conducted with the calling party, based on the result of the search of the telephone number.

In a further aspect, the communication unit transmits audio data to the vehicle, when the response indicates the output device includes an audio component, the audio data indicating whether the communication should be conducted with the calling party, based on the result of the search of the telephone number.

In an additional aspect, the processing unit indicates that the communication should not be conducted with the calling party, when the textual search indicates a predetermined number of occurrences of the plurality of predetermined words.

The information-processing apparatus preferably includes a local memory.

In one embodiment, the processing unit stores the telephone number in the local memory, when the textual search indicates a predetermined number of occurrences of the plurality of predetermined words.

In another embodiment, the local memory stores a URL (Uniform Resource Locator) of the search engine. The processing unit retrieves the URL of the search engine from the local memory.

Preferably, the communication unit transmits a request to the search engine for an additional search engine, receives a URL of the additional search engine in response to the request for the additional search engine, and transmits the telephone number to the additional search engine.

In a further embodiment, the local memory stores a URL of a telephone number comments site. The processing unit retrieves the URL of the telephone number comments site from the local memory. The communication unit transmits the telephone number to the telephone number comments site and receives the result of the search from the telephone number comments site.

In an additional embodiment, the local memory stores a URL of the search engine. The communication unit transmits a request for the URL of the telephone number comments site to the search engine.

Preferably, the processing unit produces an indication that the calling party is unknown, when the textual search indicates less than a predetermined number of occurrences of the plurality of predetermined words.

The information-processing apparatus, in one aspect, includes a display that displays whether the communication should be conducted with the calling party.

The information-processing apparatus, in another aspect, includes a speaker that outputs a sound indicating whether the communication should be conducted with the calling party.

The information-processing apparatus, in a further aspect, includes a vibration unit. The processing unit controls the vibration unit to indicate whether the communication should be conducted with the calling party.

In one embodiment, the information-processing apparatus is a mobile telephone.

In another embodiment, the information-processing apparatus is an electronic control unit of a vehicle.

Preferably, the communication unit transmits the transmission of the telephone number only after the processing unit determines that the telephone number of the calling party is unknown.

In another embodiment, an information-processing method includes receiving, at an information-processing apparatus, a telephone call from a telephone number of a calling party. The method also includes transmitting, from the information-processing apparatus, the telephone number to a search engine in response to the receiving the telephone call. Further, the method includes receiving a result from the search engine in response to the transmitting, determining whether a communication should be conducted with the calling party, by performing a textual search of the result for a plurality of predetermined words.

In a further embodiment, an information-processing apparatus includes communication means for receiving a telephone call from a telephone number of a calling party, for transmitting a transmission of the telephone number to a search engine when the communication means receives the telephone call, and for receiving a result from the search engine after the transmission of the telephone number. The information-processing apparatus also includes processing means for determining whether a communication should be conducted with the calling party, by performing a textual search of the result for a plurality of predetermined words.

DETAILED DESCRIPTION

Figure 1:
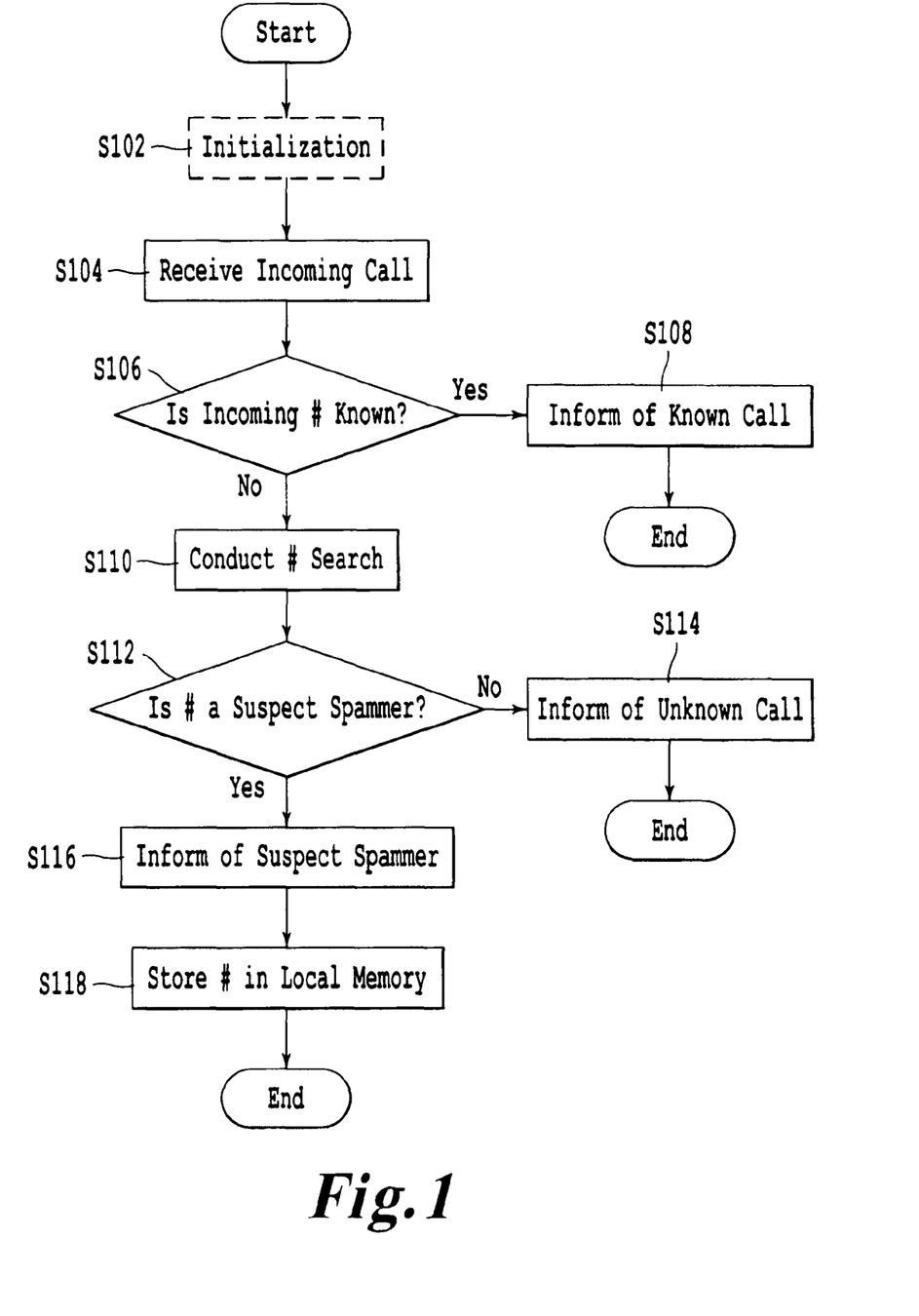
FIG. 1 is a flowchart of an algorithmic process to indicate whether a user should answer or return an incoming telephone call.

FIG. 1 shows an exemplary process for an intelligent agent according to one embodiment. In this example, the device in which the agent resides is a telephone. However, the device is not limited to a telephone, as discussed later.

The process preferably begins at step S102, at which a later-described search engine initialization procedure is performed. This search engine initialization procedure provides further advantages, as discussed later.

At step S104, the telephone receives an incoming call from a telephone number of a calling party. When the call is received, the agent acquires the telephone number of the calling party. For example, the telephone number of the calling party is transmitted by a caller ID system to the telephone during a ringing signal. However, the present disclosure is not limited to any particular method of communicating a telephone number of a calling party.

At step S106, the agent determines whether the telephone number of the calling party is stored in a locally-stored electronic phone book. In a preferred aspect, the agent determines whether the telephone number has been associated with a name, a picture, or an alias in the telephone book. If the agent determines the telephone number of the calling party is stored in the telephone book, the agent informs the user at step S108. In one embodiment, the telephone displays or audibly reproduces the name or alias associated with the telephone number or displays the associated picture. In another embodiment, the telephone merely displays or audibly reproduces the phrase "caller is known." In further embodiments, the telephone provides a vibration pattern to indicate the telephone number of the calling party is known, such as three short vibrations per ring. Audio patterns or audio voices can also be used, either independently or together with vibration notifications. After the user is informed that the calling party is known, the process ends.

If the agent determines at step S106 that the number of the calling party is not known, the agent conducts a telephone number search at step S110. An exemplary telephone number search is described later. In the telephone number search, a network search engine, such as one available over the Internet, searches for the telephone number of the calling party among various databases and/or web sites.

At step S112, the agent determines, based on the results of the telephone number search, whether the telephone number corresponds to a suspected spammer. If the telephone number does not correspond to a suspected spammer, the agent informs the user at step S114 that the telephone number corresponds to an unknown party. In some embodiments, the telephone displays or audibly reproduces the phrase "caller is unknown." The audio reproduction is preferable, as it allows a preoccupied user to maintain visual focus on other matters. For example, a driver can keep his eyes on the road, rather than look at a video display. In another embodiment, the telephone provides a vibration pattern, such as one long vibration and one short vibration per ring. The vibratory output allows a user to maintain both visual and auditory focus on other matters. For example, a driver might be listening to directions audibly reproduced from a GPS system or listening to music on a car audio system at the time the incoming call is received. In some embodiments, the various forms of informing a user are stored in a read-only memory at a time of manufacturing the telephone. In other embodiments, the forms of informing the user are selected by a user input to modify settings of the telephone.

If the telephone number corresponds to a suspected spammer, the agent informs the user at step S116 that the call corresponds to a suspected spammer. In some embodiments, the telephone displays the phrase "suspected spammer," as discussed later, or displays a name of the specific spammer identified by the results of the search. In other embodiments, the telephone audibly reproduces the phrase "suspected spammer" or "do not answer call." In still other embodiments, the telephone provides a vibration pattern to indicate the calling party is a suspected spammer, such as only one long vibration per ring.

If the telephone number corresponds to a suspected spammer, the agent stores the telephone number of the suspected spammer in a local memory at step S118, such as a hard disk or a non-volatile memory. When the telephone number is stored, the agent more quickly recognizes the calling party when a call is next received from the same telephone number. In one embodiment, the telephone numbers of spammers are stored separately from the personal telephone book of the user.

In another embodiment, the telephone provides no immediate audio, visual, or vibratory feedback to avoid distracting the user, if the agent determines the call is from a suspected spammer. Instead, the agent only stores an electronic record of the call. Thus, the user can review the list of calls at his convenience and edit the list as appropriate, e.g., if some numbers are not really from spammers.

Figure 2:
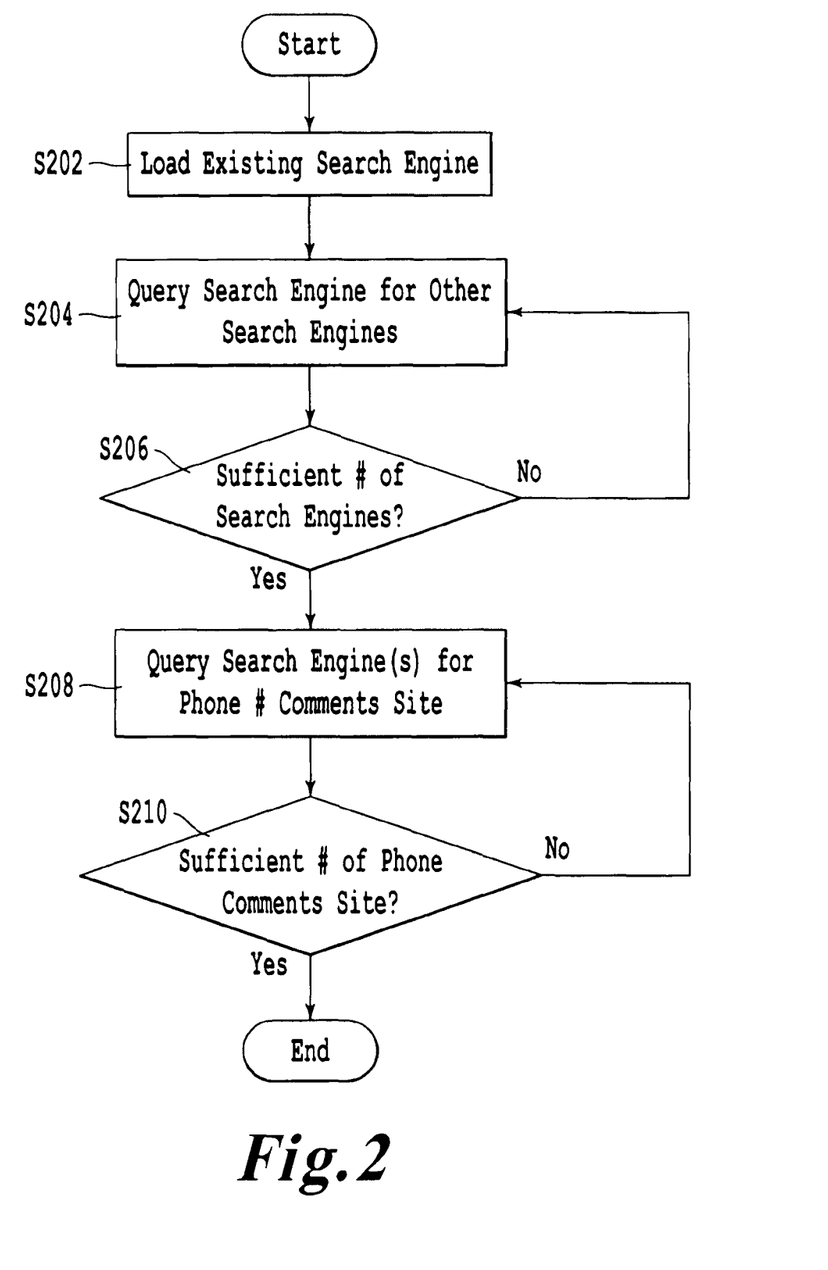
FIG. 2 is a flowchart of an algorithmic process for a search engine initialization procedure.

FIG. 2 shows an embodiment of a search engine initialization procedure. In one embodiment, the agent performs the initialization procedure upon receipt of a call. Preferably, the agent performs the procedure in advance of a call, such as at device startup. In some embodiments, the initialization procedure is performed regularly, such as on a monthly basis.

At step S202, the agent wirelessly accesses at least one general search engine by way of an Internet connection. At step S204, the agent preferably queries the at least one search engine for other search engines, such as by sending text including the phrase "Internet search engine." This feature provides for new search engines being added to the Internet, existing search engines providing enhanced results, and for maintaining a plurality of search engines if a previous search engine is no longer available or favored. At step S206, the agent determines whether a sufficient number of search engines has been retrieved. The number of search engines deemed sufficient can be as few as one or two. In some embodiments, the number of search engines deemed sufficient is programmed at the time of manufacture of the telephone or agent and is stored in a read-only memory. In further embodiments, the number of search engines is set by a user by way of a touch display, a keyboard, a voice command, or the like. Alternatively, the number of search engines deemed sufficient is based on attributes of the system, such as processor speed, available communication bandwidth, memory availability or current or average signal strength.

If an insufficient number of search engines has been retrieved, the process returns to step S204 to further query.

If a sufficient number of search engines is available, at step S208, the agent queries one of the search engine(s) for a telephone number comments site. This feature provides for new phone number comment sites developing or for existing ones to provide enhanced results or to no longer be available or favored. In one embodiment, the agent transmits the text "telephone number comments" to the search engine(s). The agent preferably sends additional search terms, such as "telemarketer" or "spammer." The search engine processes the search terms in a known manner, and returns the results thereof to the agent.

At step S210, the agent judges whether a sufficient number of phone number comment sites has been retrieved. In some embodiments, the number deemed sufficient is programmed at the time of manufacture of the telephone or agent and is stored in a read-only memory. Alternatively, the number is set by a user by way of a touch display, a keyboard input, a voice command, or the like. In other embodiments, the number of comments sites deemed sufficient is based on attributes of the system, such as the processor speed, the available communication bandwidth, the memory availability, or the current or average signal strength.

If an insufficient number of telephone number comments sites has been retrieved, the process returns to step S208 to further query. If a sufficient number of sites has been retrieved, the initialization procedure ends.

Figure 3:
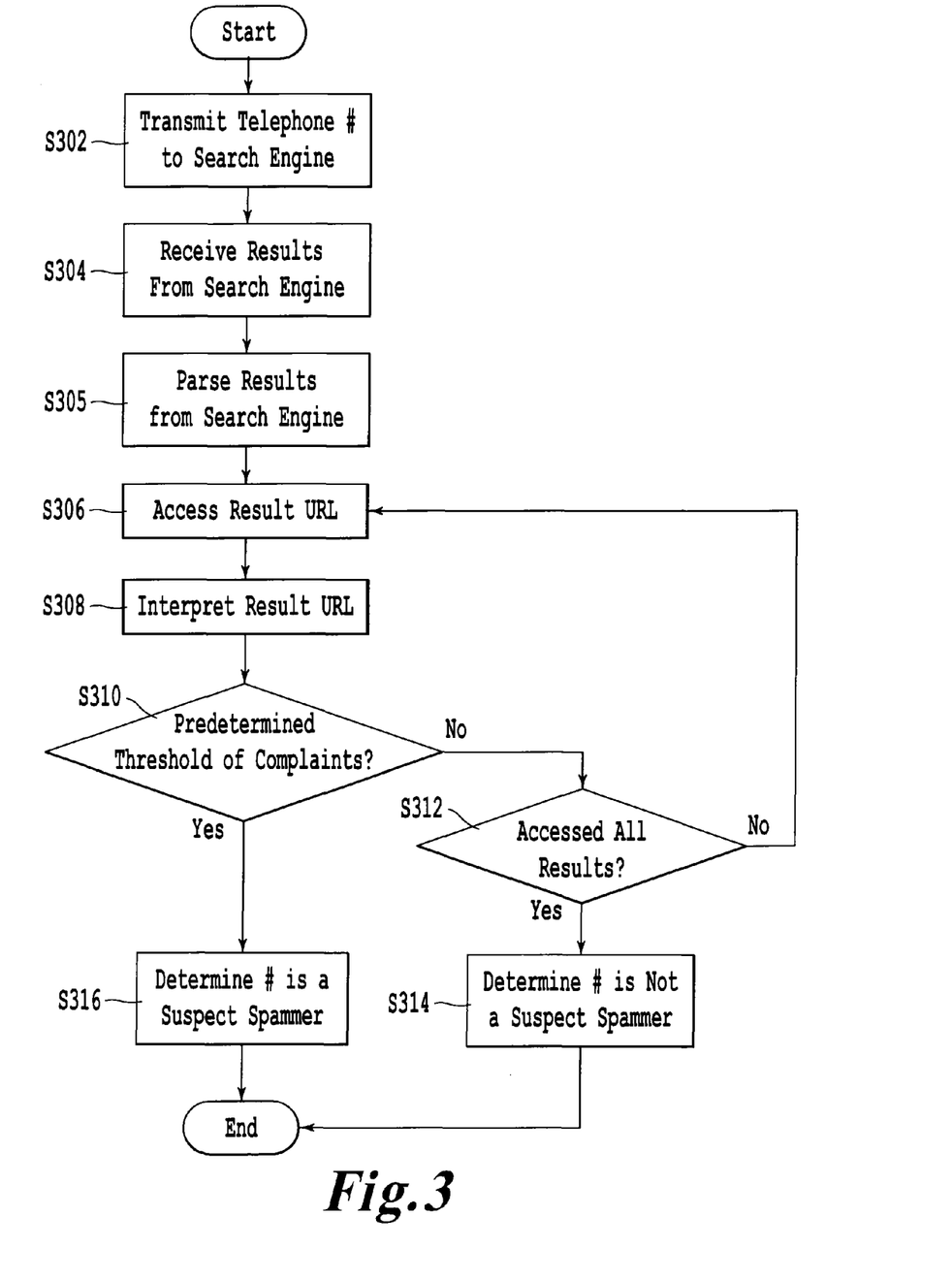
FIG. 3 is a flowchart of an algorithmic process for conducting a telephone number search.

FIG. 3 shows an embodiment of a telephone number search conducted by the agent. At step S302, the agent wirelessly transmits the telephone number of the calling party to a search engine accessible through a network, for example, the Internet upon a receipt of the telephone call. Further, in some enterprise environments, the search engine is located on an intranet. The search engine might be a general search engine, such as one of the search engines found in step S204, or a telephone number site found in step S208. If a general search engine is used, the telephone number is preferably accompanied by search terms which narrow the search results to telemarketing, such as "telemarketer" or "telephone comments." The search engine conducts a search in a known manner and returns the results thereof to the agent.

At step S304, the agent receives the results of the search from the search engine. In one embodiment in which multiple search engines are used, the agent advances the process to step S305 after receiving results from only one search engine. In other embodiments, the advancement to step S305 occurs only after receiving results from all the searched search engines. In alternative embodiments in which multiple search engines are used, the process advanced to step S305 after a determination that a predetermined time since beginning the search has expired.

Because general search engines can return hundreds of hits, the agent limits the processing to URL results returned on the first page of the search engine's results. Alternatively, the processed results are limited to a predetermined number, such as 5. In other embodiments, the agent adjusts the number of results processed based on characteristics of the phone number. One characteristic is whether calls have previously been received from the phone number. If a call has not previously been received from the phone number, the agent will process a greater number of results, because the call is more likely to be unsolicited.

Alternatively, the agent adjusts the number of results based on whether the telephone book contains few telephone numbers having the area code of the telephone number from which the call is received. For example, if the telephone book has many entries in a particular area code, that fact indicates an increased likelihood that the user knows additional parties in the same area code. Thus, the agent will process a lower number of results.

In another example, if many previous spammer calls have been recorded as later described, that fact indicates that a particular area code has characteristics (such as laws or costs of living) beneficial to telemarketer call centers. In that scenario, the agent will process a greater number of results.

At step S305, the agent preferably parses the URL of one of the search engine results to determine whether the telephone number is associated with a suspected spammer. In one example, the domain of a URL indicates that a calling party is a spammer, if that domain exclusively logs telephone numbers of spammers. The fact of the exclusive logging of spammers can be indicated by a user input.

Alternatively, the path of the URL indicates that a calling party is a spammer, if the path includes a directory called, for example, "telemarketers." In other embodiments, the agent uses the query string or the fragment identifier of the URL in a similar manner. This parsing allows the agent to minimize the duration of the processing.

In some embodiments, the agent accesses a result URL by, for example, sending a hypertext transfer protocol request at step S306. The agent then receives content, such as a hypertext document, from the URL in a manner known in the art.

Subsequently, the agent determines at step S308 whether the content contains text associated with complaints. For example, the agent can use an algorithm that matches the text with complete or partial words, such as "annoy," "telemarketer," "spammer," or "not." Other algorithms are used to search the text for words entirely written in capital letters, which indicate a user's dissatisfaction with the call. Other algorithms search for punctuation, such as delimiting asterisks or multiple exclamation points, which indicate emphasis or frustration. Additional algorithms interpret images or videos included in the content, using optical character recognition and voice recognition. Thus, in some embodiments, the agent uses content retrieved from social networking sites or video sharing websites.

In another exemplary parsing, a general search engine returns text from result URLs as part of the search results of the search engine. Thus, it is sufficient to use an interpretation algorithm, such as the text matching, on the results page of the search engine. Accordingly, the agent can parse data from a particular URL without actually accessing a hypertext transfer protocol request to the URL.

Next, the agent determines at step S310 whether the search result interpretation yields a predetermined threshold of complaints. For example, the agent can select as a threshold a predetermined number, such as 1 or 5. Alternatively, the agent determines the threshold based on a ratio of positive reviews to negative reviews. Such an embodiment addresses the situation in which one user (such as the telemarketer himself) provides a positive review of the telephone number, although several users provide a negative review of the telephone number. This ratio embodiment is also advantageously used in an example where one user maliciously flags an otherwise respectable telephone number. Other embodiment includes a temporal aspect of the posting of the complaints to reflect a change in the ownership of the telephone number.

In another embodiment, the agent modifies the determination whether the search results interpretation yields the threshold of complaints. For example, the agent excludes comments made by a user on the telephone comments website, for example, if the user is known to be abusive. The user can input the name of the abusive user to the agent.

If the predetermined threshold of complaints is achieved, the agent determines at step S316 that the telephone number corresponds to a suspected spammer. If the predetermined threshold of complaints is not achieved, the agent determines at step S312 whether a sufficient number of result URLs has been accessed. If a sufficient number of result URLs has been accessed, the agent determines at step S314 that the telephone number does not correspond to a suspected spammer. If an insufficient number of result URLs have not been accessed, the agent returns to step S306 to access the next result URL. In some embodiments, the sufficient number of accessed URLs differs from the sufficient number of retrieved URLs.

Figure 4:
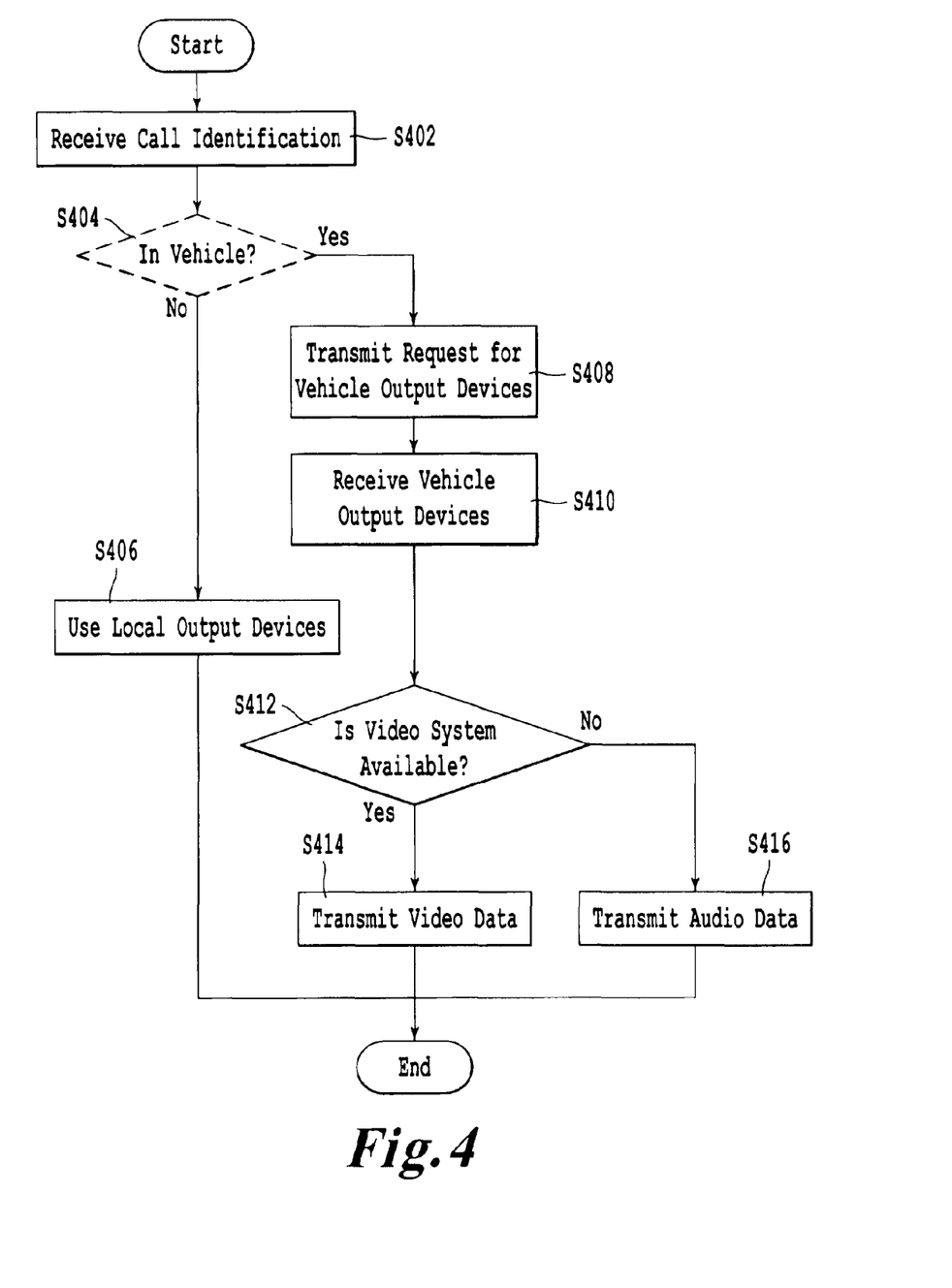
FIG. 4 is a flowchart of an algorithmic process for outputting results of a search.

FIG. 4 shows an exemplary algorithm for outputting the results of a telephone number search. As noted above, if the telephone number is determined not to be a suspected spammer, the user is informed of an unknown call. If the phone number is associated with the suspected spammer, the phone number is flagged as spam, and the agent advises the user not to bother answering or returning the call. In some embodiments, the agent prompts the user to determine whether he would like to follow up with the caller at a later date.

At step S402, the agent receives an identification as to whether the calling party corresponds to a suspected spammer or not. At step S404, there is preferably a determination whether the telephone is in or near a vehicle. In some embodiments, this determination is performed by a handshaking in a wireless communication with a limited communication range. In other embodiments, this determination is performed via a wired communication with the vehicle. Either of these communications suggests that the telephone is within a predetermined range of the vehicle. The use of the telephone near a vehicle leads to a presumption that the user is under severe time or attention constraints and cannot be distracted.

Further, the agent can determine whether the telephone is in a vehicle using sensors installed on the vehicle. Such a sensor can detect motion and can be, for example, a wheel encoder. Thus, if the telephone is actually inside the vehicle, and the vehicle is in motion, then an even stronger presumption of the user's time/attention constraints can be made.

If the agent does not perform step S404 or if the telephone is not near or within a vehicle, the agent uses local output devices of the telephone at step S406. In one example, the telephone uses a screen embedded in the same casing as the telephone. Alternatively, the telephone uses an embedded speaker or headphones plugged into the telephone. In another embodiment, the telephone uses a vibration device embedded in the telephone.

If the agent determines in step S404 that the telephone is located in a vehicle, the agent sends a request to determine the available remote output devices at step S408. For example, the telephone sends such a request by broadcast or by a wireless communication having a predetermined communication distance. In another example, the telephone sends the request by a wired communication. In step S410, the telephone receives an indication of the available remote output devices in response to the request.

The agent makes a determination in step S412 whether a remote video system is available. In some embodiments, such a video system is provided in the form of a television screen extending from the roof of a vehicle and that is viewable from the driver seat of the vehicle. Alternatively, a video system is provided in the form of a video heads-up display on the windshield. In other embodiments, a screen is embedded in the dashboard. If a remote video output device is available, the telephone transmits video data to the video output device at step S414. If a remote video system is not available, the agent transmits audio data to the speakers of the vehicle's audio system at step S416 via a broadcast, a wired communication, or a wireless communication having a predetermined communication range.

In other embodiments, preference is given to audio output over video output. In such a case, the agent receives a notification of a remote speaker. If the agent later receives additional information that the speakers of the vehicle are not available, the telephone transmits video data instead.

Figure 5:
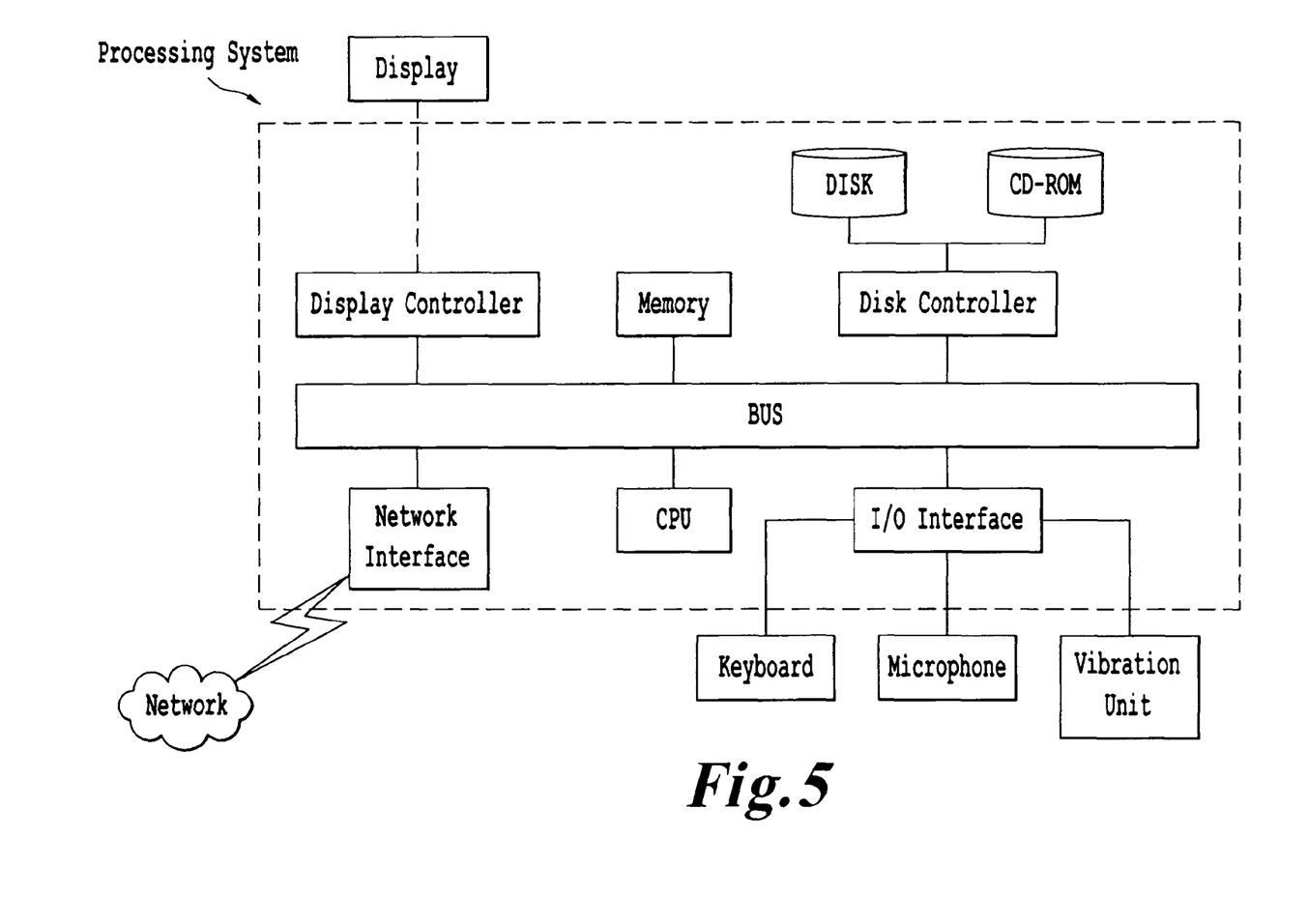
FIG. 5 shows a system used in an embodiment.

FIG. 5 shows an exemplary embodiment of the device. The device includes a display, a display controller, a memory, a hard disk, a CD-ROM, a disk controller, a bus, a network interface, a CPU, and an I/O interface.

The display is used to output information that is to be viewed by a user. For example, the display is a liquid crystal display, an LED or a video screen embedded in a cellular phone. The display is an example of a displaying means.

The display controller controls a display by sending a video signal to the aforementioned display or a display of another device with which the device communicates. The display controller is an example of a display controlling means.

One or multiple local memories are included in the device. The local memory and the hard disk store an electronic telephone book or a list of previously identified spammers and the like. The local memory and the hard disk include any of a ROM, RAM, an EPROM, an EEPROM, a PAL, a GAL, a magnetic disk, an optical disk, or a magneto-optical disk. The local memory and the hard disk store similar or different information. The local memory and the hard disk are examples of a storing means.

A disk controller controls access to the memories.

A network interface provides access to a network, such as the Internet. The network interface is an example of a communication means.

A CPU is an exemplary embodiment of a processor or processing means. The CPU can include one of multiple processors. The processors can be application-specific or generally available.

An input/output interface provides interaction with the user of the device. For example, a keyboard, jog dial, mouse, keypad, and a microphone are included in or are connected to the device. Preferably, a vibration unit is present to provide vibrational feedback to a user. The input/output interface also includes, or is connected to, speakers or headphones.

Figure 6:
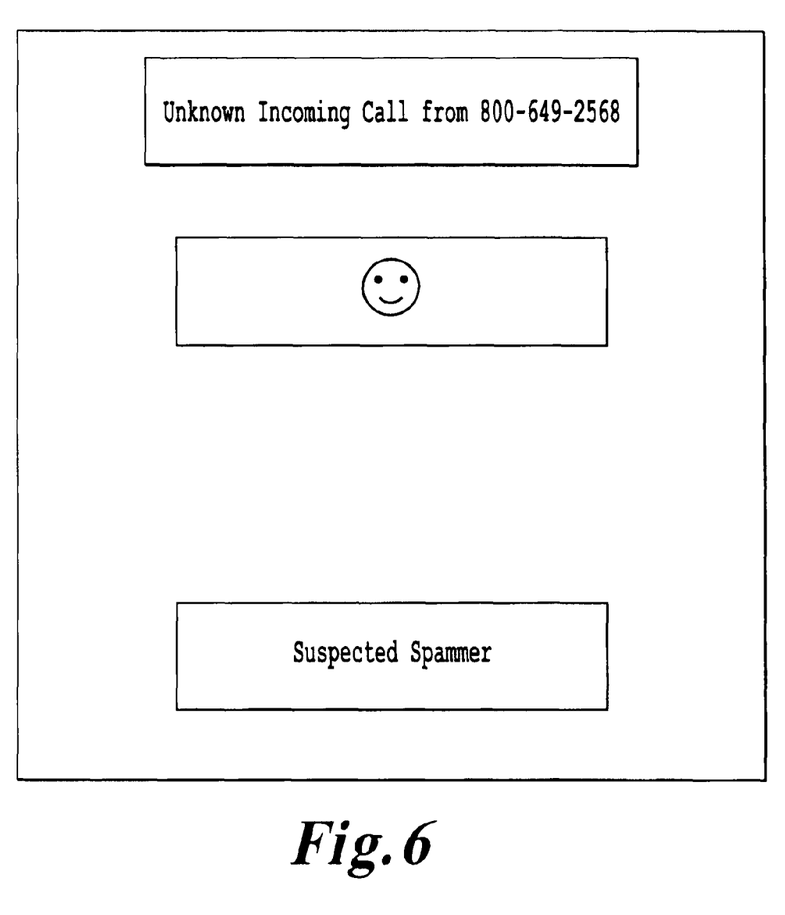
FIG. 6 shows an example of a display of a telephone indicating an incoming call is associated with a spammer.

FIG. 6 shows a physical display of a telephone. At the top of the display, text indicates that an unknown incoming call is being received. The display also indicates a telephone number from which the call is received. In the center of the display, a default picture is displayed. At the bottom of the display, a result of a search conducted by the intelligent agent is displayed. In this example, the result is "suspected spammer."

The agent is programmed in any programming language, such as Java, Python, and C++.

In one embodiment, the incoming call will cause the telephone to ring normally. Subsequently, once the agent obtains the results of the search procedure, the agent changes the ringing to let the user know he should not answer the call.

In other embodiments, the results of the search are obtained before the first ring. That is, the agent provides the user with no indication of the incoming call until the search procedure determines the caller is not a suspected spammer. This procedure can complement the standard ringing or modified ringing set forth above.

In other embodiments, the agent searches a voicemail for telephone numbers via voice recognition software. The agent adds flags indicating whether the mail should be heard or whether the call should be returned to the voicemail based on the determination. The output of the flags can be conducted via visual voicemail or as described herein with respect to the display, audio playback device, and vibration unit.

The telephone preferably saves the identification results and telephone number of the suspected spammer telephone number. In this manner, evidence will be available to a driver to explain why the telephone decided that the phone number was associated with the spammer.

Further, in the event that the telephone number is unknown, the telephone number is preferably communicated to the user. The user is able to use his own personal knowledge as to the identity of the calling party.

In some embodiments, a user removes a phone number from a list of suspected spammers. For example, if a suspected spammer calls and the user answers, the user might determine the calling party was improperly associated with a spammer. A similar result can occur if the suspected spammer leaves a voicemail message and the user reviews the voicemail. The user adds to or deletes from the local phone book the suspected spammer's telephone number.

In one embodiment, the vehicle itself includes the agent and device. Alternatively, the device is a tablet computer or GPS provided with telephonic service.

The agent is implemented in hardware, software, or a combination thereof. In embodiments in which the agent is embodied in software, it is stored in a transitory storage medium, such as a propagating wave or signal. In other embodiments, the agent is stored in a nontransitory storage medium, such as a RAM, a ROM, a hard disk, or other memory. Further, if the agent is embodied in software, it is executed by the processor of the exemplary system.

It should be appreciated that not all steps described in the specification are required to obtain the advantages discussed in this disclosure. Further, the steps are not necessarily performed in the sequences described. Additional embodiments are possible as reflected in the appended claims.

The invention claimed is:

1. An information-processing apparatus, comprising:
    communication circuitry configured to receive a telephone call from a telephone number of a calling party, transmit the telephone number to a search engine on the Internet when the telephone call is received, and receive a result from the search engine after the telephone number is transmitted; and
    a processor configured to determine whether the telephone call from the telephone number should be conducted with the calling party based on a textual search of the result from the search engine for a plurality of predetermined words.

2. The information-processing apparatus according to claim 1, wherein the processor is configured to determine whether the information-processing apparatus is in proximity to a vehicle.

3. The information-processing apparatus according to claim 2, wherein the communication circuitry transmits a request to the vehicle, when the processor determines that the information-processing apparatus is in proximity to the vehicle, and the communication circuitry receives a response to the request, the response indicating an output device available in the vehicle.

4. The information-processing apparatus according to claim 3, wherein the communication circuitry transmits video data to the vehicle, when the response indicates the output device includes a video component, the video data indicating whether the telephone call from the telephone number should be conducted with the calling party based on the result of the search of the telephone number.

5. The information-processing apparatus according to claim 3, wherein the communication circuitry transmits audio data to the vehicle, when the response indicates the output device includes an audio component, the audio data indicating whether the telephone call from the telephone number should be conducted with the calling party based on the result of the search of the telephone number.

6. The information-processing apparatus according to claim 1, wherein the processor is configured to indicate that the telephone call from the telephone number should not be conducted with the calling party when the textual search indicates a predetermined number of occurrences of the plurality of predetermined words.

7. The information-processing apparatus according to claim 6, further comprising:
    a local memory, wherein the processor is configured to store the telephone number in local memory when the textual search indicates a predetermined number of occurrences of the plurality of predetermined words.

8. The information-processing apparatus according to claim 1, further comprising:
    a local memory that stores a URL (Uniform Resource Locator) of the search engine, wherein the processor retrieves the URL of the search engine from the local memory.

9. The information-processing apparatus according to claim 8, wherein the communication circuitry transmits a request to the search engine for an additional search engine, receives a URL of the additional search engine in response to the request for the additional search engine, and transmits the telephone number to the additional search engine.

10. The information-processing apparatus according to claim 1, further comprising:

a local memory that stores a URL (Uniform Resource Locator) of a telephone number comments site, wherein the processor retrieves the URL of the telephone number comments site from the local memory, and the communication circuitry transmits the telephone number to the telephone number comments site and receives the result of the search from the telephone number comments site.

11. The information-processing apparatus according to claim 10, wherein the local memory stores a URL of the search engine, and the communication circuitry transmits a request for the URL of the telephone number comments site to the search engine.

12. The information-processing apparatus according to claim 1, wherein the processor produces an indication that the calling party is unknown when the textual search indicates less than a predetermined number of occurrences of the plurality of predetermined words.

13. The information-processing apparatus according to claim 1, further comprising:
a display that displays whether the telephone call from the telephone number should be conducted with the calling party.

14. The information-processing apparatus according to claim 1, further comprising:
a speaker that outputs a sound indicating whether the telephone call from the telephone number should be conducted with the calling party.

15. The information-processing apparatus according to claim 1, further comprising:
a vibration unit, wherein the processor controls the vibration unit to indicate whether the communication should be conducted with the calling party.

16. The information-processing apparatus according to claim 1, wherein the information-processing apparatus is a mobile telephone.

17. The information-processing apparatus according to claim 1, wherein the information-processing apparatus is an electronic control unit of a vehicle.

18. The information-processing apparatus according to claim 1, wherein the communication circuitry transmits the telephone number only after the processor determines that the telephone number of the calling party is unknown.

19. An information-processing method, comprising:
receiving, at an information-processing apparatus, a telephone call from a telephone number of a calling party;
transmitting, from the information-processing apparatus, the telephone number to a search engine on the Internet in response to the receiving the telephone call;
receiving a result from the search engine in response to the transmitting; and
determining whether the telephone call from the telephone number should be conducted with the calling party based on a textual search of the result from the search engine for a plurality of predetermined words.

20. An information-processing apparatus, comprising:
communication means for receiving a telephone call from a telephone number of a calling party, for transmitting of the telephone number to a search engine on the Internet when the communication means receives the telephone call, and for receiving a result from the search engine after the telephone number is transmitted; and
processing means for determining whether the telephone call from the telephone number should be conducted with the calling party, based on a textual search of the result from the search engine for a plurality of predetermined words.

* * * * *